United States Patent [19]
Harrison

[11] Patent Number: 5,356,702
[45] Date of Patent: Oct. 18, 1994

[54] SOUND DAMPENER FOR DISK BRAKES

[76] Inventor: Everett W. Harrison, 508 N. Shore Dr., South Haven, Mich. 49090

[21] Appl. No.: 153,577

[22] Filed: Nov. 16, 1993

Related U.S. Application Data

[63] Continuation of Ser. No. 937,546, Aug. 28, 1992, Pat. No. 5,289,904.

[51] Int. Cl.$^5$ .......................... B32B 5/26; B32B 33/00
[52] U.S. Cl. ..................... 428/236; 156/228; 181/290; 188/73.1; 188/251 A; 264/258
[58] Field of Search .......................... 188/73.1, 251 A; 156/228; 181/290; 264/258; 428/236

Primary Examiner—James C. Cannon
Attorney, Agent, or Firm—Varnum, Riddering, Schmidt & Howlett

[57] ABSTRACT

A sound dampener for a disk brake assembly comprising a composite of vinyl ester and glass. Preferably, the composite is comprised of a region of woven glass sandwiched between a layer of vinyl ester and another layer of vinyl ester in which random strands of glass are embedded. The composite dampens the vibrations induced by the friction associated with the disk brake assembly to eliminate brake squeal. The composite also has low rates of thermal conductivity and thermal expansion which aid in reducing break squeal.

10 Claims, 2 Drawing Sheets

SOUND DAMPENER FOR DISK BRAKES

This is a continuation, of application Ser. No. 937,546 filed Aug. 28, 1992, now U.S. Pat. No. 5,289,904.

BACKGROUND OF THE INVENTION

1. Field of the Invention

This invention relates to disk brakes, and more particularly to a composite sound dampener for use in disk brakes to eliminate brake squeal.

2. Description of the Related Art

Sound dampeners for disk brakes are used in disk brake assemblies to eliminate or reduce brake squeal. It is known to use a sound dampener made from a composite of elastomeric material and glass particles. The elastomeric material dampens the vibrations, and the glass particles reduce the rate of heat transfer.

Many types of sound absorbers are known. U.S. Pat. No. 4,154,322 issued to Yamamoto et al. on May 15, 1979, discloses a sound dampener comprising a wire mesh screen between a backing plate and metal shim. U.S. Pat. No. 4,373,615 issued to Melinat on Feb. 15, 1983, discloses a laminated sound dampener comprising a ceramic heat barrier, an elastomeric vibrational absorbing material, a second metal plate and an optional second elastomeric layer. U.S. Pat. No. 3,885,651 issued to Odier on May 27, 1975, discloses a sound dampener comprising a butyl rubber layer and a metal plate.

SUMMARY OF THE INVENTION

In accordance with the invention, an improved sound dampening element is incorporated in a disk brake assembly having a friction pad mounted on one side of a backing plate and the sound dampening element disposed on the other side of the backing plate. The sound dampening element is positioned for engagement with a piston to urge the friction pad against a rotating disk of the disk brake assembly. The improved sound dampening element, comprises a thermally stable, nonmetallic composition surrounding a zone of random glass fibers and a layer of woven glass.

Preferably, the nonmetallic composition is a polymer such as, but not limited to, vinyl ester or polyester. The nonmetallic composition can have a coating of silicone.

Preferably, the dampening element is mounted to the vacuum plate only by mechanical means such as, but not limited to, rivets.

Also according to the invention, a method for making the vibration dampening element has the following steps: obtaining a sheet of woven glass, applying to the sheet a nonmetallic composition having a zone of random glass; compressing the nonmetallic composition against the sheet; and heating the nonmetallic composition and the sheet sufficiently to cause the nonmetallic composition to flow into and around the interstices of the woven glass.

Preferably, the composition is heated to at least 300° F. and the applied pressure is at least 3,000 psi. The pressure is preferably applied for three minutes. A curing agent and a fire retardant can be included in the process.

BRIEF DESCRIPTION OF THE DRAWINGS

The invention will now be described with reference to the drawings in which.

DETAILED DESCRIPTION OF THE PREFERRED EMBODIMENTS

Figure 1:
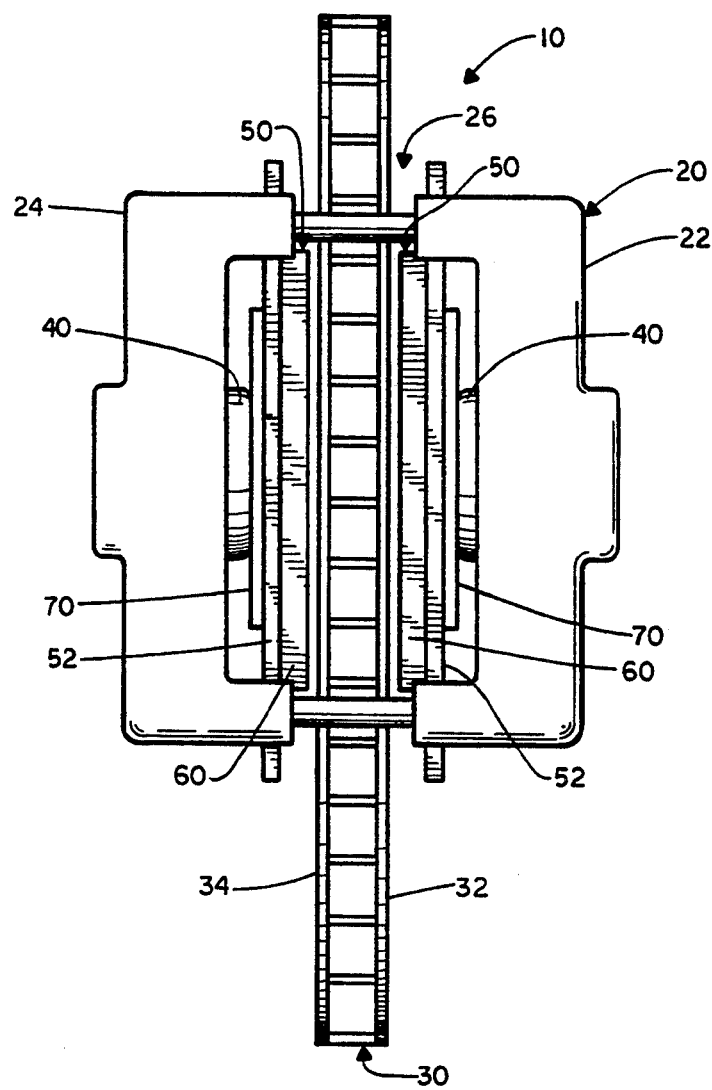
FIG. 1 is a top view of a conventional disk brake assembly illustrating the environment of the invention.

FIG. 1 illustrates the environment in which the invention operates. A conventional disk brake assembly 10 comprises a caliper 20, a rotor 30 and opposing hydraulic pistons 40. The caliper 20 is fixed to a non-rotatable part of the vehicle and has opposed arms 22, 24 which form a channel 26 between the opposed arms 22, 24. The opposed arms 22, 24 move axially with respect to each other. The rotor 30 is mounted to the axle (not shown) and a portion of the rotor 30 is disposed within the U-shaped channel 26 between the opposed arms 22, 24 of the caliper 20. The rotor 30 is disk-shaped and has opposed surfaces 32, 34. A hydraulic piston 40 is mounted to each of the opposed arms 22, 24 of the caliper 20 and is axially movable perpendicular to the rotor 30.

A brake shoe 50 is mounted to each opposed arm 22, 24 of the caliper 20 between the piston 40 and the rotor 30. Generally, each brake shoe 50 comprises a backing plate 52, with a friction pad 60 on one side and a sound dampener 65 on the other side. The brake shoe 50 is mounted to the caliper 20 so that the friction pad 60 confronts one of the surfaces 32, 34 of the rotor 30, and the sound dampener 65 confronts the corresponding piston 40. The friction pad 60 and sound dampener 65 are typically mounted to the backing plate 52 by mechanical fasteners such as rivets and/or glue. Typically, prior art sound dampeners include expansion slots (not shown) which accommodate expansion and contraction of the dampener from the friction induced heat.

In operation, both hydraulic pistons 40 and brake shoes 50 act identically on the rotor 30. Therefore, only the operation of one hydraulic piston 40, brake shoe 50 and rotor 30 is provided in detail. As the brakes of the vehicle are applied, the hydraulic piston 40 contacts the sound dampener 65 of the brake shoe 50, moving the friction pad 60 of the brake shoes 50 axially and into contact with the surface 32 of the rotor 30. The friction between the rotor 30 and friction pad 60 is sufficient to slow the rotation of the rotor 30 and, thus, the vehicle.

The friction generated between the rotor 30 and the brake shoe 50 is the source of many problems associated with disk brakes. First, the friction induces the brake shoe 50 to vibrate which causes the disk brakes to squeal during braking. Second, the friction generates a large amount of heat which impairs braking efficiency and further promotes squealing of the brakes by reducing the effectiveness of the sound dampener.

The disk brakes generate very high temperatures which can intermittently reach 600° F. The heat generated by the disk brakes radiates through the brake shoe 50 and piston 40 where it raises the temperature of the brake fluid in the hydraulic lines, adversely affecting the performance of the brakes. The heat also causes the sound dampener 65 to expand and contract which promotes buckling of the sound dampener, frequently resulting in the sound dampener 65 separating from the backing plate 52. Once the sound dampener 65 separates from the backing plate 52, the sound dampener 65 is less effective in reducing the friction induced vibrations, which degrades the sound-dampening properties of the sound dampener 65 and shortens the useful life of the sound dampener.

The short life of a typical sound dampener 65 is undesirable. A typical sound dampener lasts approximately 12,000 miles which is greatly disproportionate to the typical life of a friction pad which lasts approximately 50,000 miles, resulting in the need to replace the sound dampener much sooner than the brake pads and, consequently, increased vehicle maintenance cost. Therefore, it is desirable to obtain a sound dampener having a greater life than the typical prior art sound dampener.

To overcome the buckling of the sound dampener 65, most sound dampeners are riveted and glued to the backing plate 52. Further, most sound dampeners have expansion slots to provide for the expansion of the sound dampener 65 without buckling. It has long been a need for a longer-life sound dampener which satisfactorily dampens the squeal caused by friction induced vibrations and which further has low heat transfer properties to overcome the above-mentioned problems.

Figure 2:
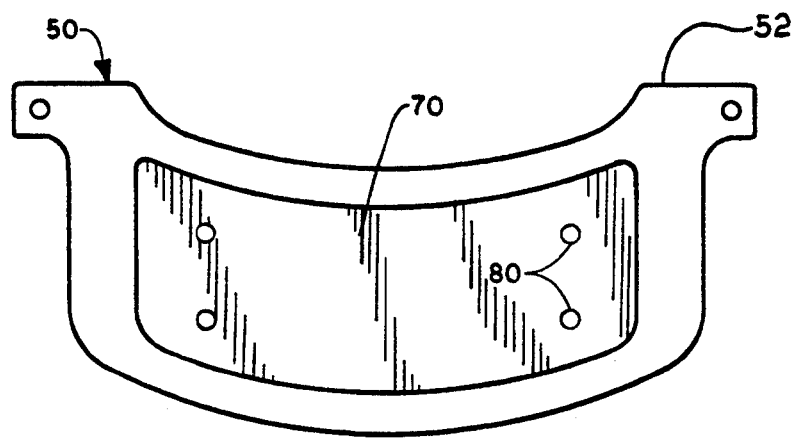
FIG. 2 is a plan view of a brake pad with a typical sound dampener.

An improved sound dampener according to the invention is illustrated at 70 in FIG. 2 and addresses these problems. The sound dampener 70 is made from a composite material which retains its strength and rigidity under very high temperatures thereby significantly increasing the life of the sound dampener over the prior art. The composite material also has low thermal expansion and low heat transfer properties, making it thermally stable and eliminating the need for expansion slots.

Figure 3:
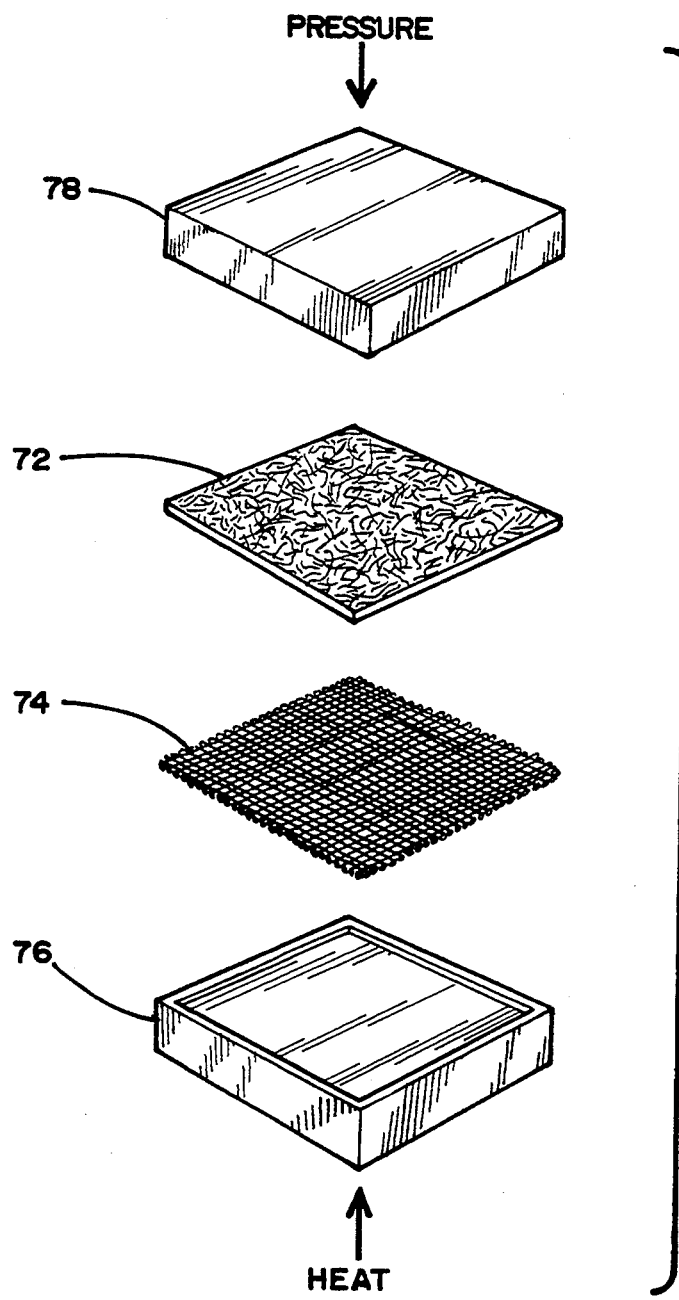
FIG. 3 is a schematic illustrating the process for making the sound dampener according to the invention.
Figure 4:
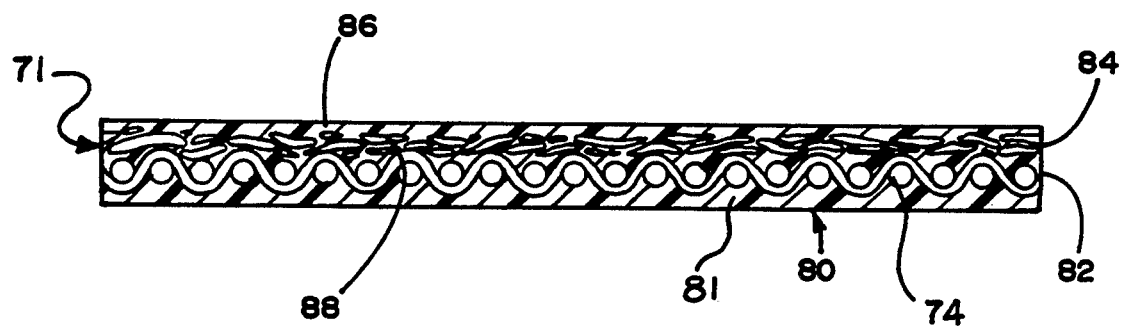
FIG. 4 is a sectional view of the composite sound dampener material according to the invention.

Referring to FIGS. 3 and 4, preferably, the sound dampener 70 is made from a nonmetallic composite 71. The composite 71 is preferably formed from a polymer such as vinyl ester or polyester and glass.

In the preferred embodiment, as illustrated in FIG. 3, the composite is formed from glass and vinyl ester. Although the composite can comprise several layers of various combinations of glass and vinyl ester, the composite 71 is preferably formed from a single sheet of vinyl ester 72 in which are embedded strands of random glass 88. A suitable source of vinyl ester with embedded random glass is Quantum, Inc. of Midland, Mich. Polymers other than vinyl ester and polyester are acceptable for use in the sound dampener as are ceramics. The preferred composition also includes a fire retardant and a heat resistant additive.

To form the composite 71, the sheet of vinyl ester 72 is disposed over a sheet of woven glass 74, both of which are then sandwiched between a lower platen 76 and an upper platen 78. The platens 76, 78 are heated, preferably electrically, to approximately 300° F. which causes the vinyl ester 72 of the sheet to melt and flow. The vinyl ester flows into and around the interstices of the woven glass sheet 74. As the vinyl ester flows, pressure, approximately 3,000 psi, is applied to the platens for a predetermined time, approximately 3 minutes. Preferably, a curing agent, a heat resistant additive and a fire retardant are incorporated in the polymer or added to the composite 71 prior to or during the formation of the composite 71.

The applied pressure forces the vinyl ester to flow through the woven glass, filling the interstices of the woven glass on both sides of the sheet 74. However, the random strands of glass are generally too large to pass through the weave of the woven glass sheet 74 and tend to remain on one side of the woven glass 74. The composite is then cooled and removed from the platens 76, 78.

Preferably, the thickness of the composite 71 is approximately 0.040 inches which provides for the material to fit between the backing plate 52 of the brake shoe 50 and the hydraulic piston 40. After the composite 71 is removed from the platens, the composite is coated with a heat resistant coating. Preferably, a heat resistant silicone paint is applied to the surfaces of the composite.

The sound dampener 70 is made from the composite sheet formed by the above method by cutting the sound dampener 70 from the composite 71. Preferably, the sound dampeners 70 are stamped from the composite with a die.

FIG. 4 illustrates a sectional view of the composite 71. The composite 71 has three major regions. The first region 80 comprises a film of vinyl ester 81. The second region 82 comprises the woven glass 74. The third region 84 comprises a film of vinyl ester 86 in which strands of random glass 88 are embedded. The vinyl ester of the first region 80 fills the interstices of the woven glass on one side of the woven glass 74 of the second region 82. The vinyl ester 86 and random glass 88 of the third region 84 also fills the interstices of the other side of the woven glass 74.

The composite 71 produced according to this method is non-brittle, nonmetallic, fire retardant and capable of retaining its strength and rigidity even when the composite is intermittently exposed to temperatures of up to 600° F. The ability of the composite to maintain its strength and rigidity is shown by the composite sound dampener 70 having an average life of almost 28,000 miles compared to the average life of 12,000 miles for a typical sound dampener.

The composite 71 also has superior heat transfer properties for disk brake applications because its rate of thermal conductivity and thermal expansion are very low, providing for a thermally stable composite and which retards the transfer of heat from the brake shoe 50 to the brake fluid while reducing the tendency of the sound dampener 70 to buckle and pull away from the plate 52 of the brake shoe 50. The reduced tendency to buckle also helps reduce the vibrations which cause the brakes to squeal. The composite sound dampener 70 can be mounted to the backing plate 52 with only rivets, no glue, because of its tendency not to buckle, resulting in an easier and less costly mounting of the sound dampener 70 to the backing plate 52. Further, the composite sound dampener 70 does not require expansion slots in the sound dampener 70 because the composite's very low thermal conductivity and expansion.

The sound dampener 70 also has a very good sound-dampening properties. Test results show that the sound dampener 70 made with the composite 71 dampens brake squeal much better than the prior art sound dampeners. The sound-dampening properties of a sound dampener 70 according to the invention are further supplemented by the tendency of the dampener not to buckle. Test conducted on prototype sound dampeners according to the invention show superior sound-dampening properties.

Reasonable variation and modification are possible within the spirit of the foregoing specification and drawings without departing from the scope of the invention.

The embodiments for which an exclusive property or privilege is claimed are defined as follows:

1. A dampening element for dampening the sound in a disk brake assembly comprising a thermally stable, nonmetallic composition surrounding a zone of random glass fibers and a layer of woven glass.

2. A dampening element according to claim 1 wherein the nonmetallic composition is a polymer.

3. A dampening element according to claim 2 wherein the polymer is vinyl ester.

4. A dampening element according to claim 3 wherein the nonmetallic composition has a silicone coating.

5. A dampening element according to claim 4 wherein the dampening element is mounted to the backing plate only by mechanical means.

6. A dampening element according to claim 5 wherein the mechanical means comprises rivets.

7. A dampening element according to claim 2 wherein the polymer is polyester.

8. A dampening element according to claim 7 wherein the nonmetallic composition has a silicone coating.

9. A dampening element according to claim 8 wherein the dampening element is mounted to the backing plate only by mechanical means.

10. A dampening element according to claim 9 wherein the mechanical means comprises rivets.

* * * * *